United States Patent
Sawhney et al.

(10) Patent No.: US 8,195,688 B1
(45) Date of Patent: Jun. 5, 2012

(54) DECONSTRUCTION AND TRANSFORMATION OF COMPLEX OBJECTS FOR DE-DUPLICATED STORAGE

(75) Inventors: Sanjay Sawhney, Cupertino, CA (US); Weibao Wu, Vadnais Heights, MN (US)

(73) Assignee: Symantec Operating Corporation, Mountain View, CA (US)

( * ) Notice: Subject to any disclaimer, the term of this patent is extended or adjusted under 35 U.S.C. 154(b) by 284 days.

(21) Appl. No.: 12/545,245

(22) Filed: Aug. 21, 2009

(51) Int. Cl.
*G06F 17/00* (2006.01)
(52) U.S. Cl. ........ 707/769; 707/770; 707/791; 707/795; 707/804
(58) Field of Classification Search .................. 707/769, 707/770, 791, 795, 804
See application file for complete search history.

(56) References Cited

U.S. PATENT DOCUMENTS

| | | | |
|---|---|---|---|
| 6,539,396 B1 * | 3/2003 | Bowman-Amuah | .......... 707/769 |
| 7,287,019 B2 | 10/2007 | Kapoor | |
| 7,373,520 B1 | 5/2008 | Borthakur | |
| 7,454,592 B1 | 11/2008 | Shah | |
| 7,478,113 B1 | 1/2009 | De Spiegeleer | |
| 7,539,710 B1 | 5/2009 | Haustein | |
| 7,567,188 B1 | 7/2009 | Anglin | |
| 7,610,285 B1 | 10/2009 | Zoellner | |

OTHER PUBLICATIONS

"Deep Store: An Archival Storage System Architecture", You et al., In Proceedings of the 21st International Conference on Data Engineering (ICDE) 2005.
"Content-Aware Storage Optimization", Ocarina Networks, 2009.
"The Ocarina ECOsystem", Ocarina Networks, 2009.

* cited by examiner

*Primary Examiner* — Sana Al Hashemi
(74) *Attorney, Agent, or Firm* — Meyertons, Hood, Kivlin, Kowert & Goetzel, P.C.

(57) ABSTRACT

A system and method for storing a data object in a single-instance storage system are described. The data object may be deconstructed into a template and one or more values. If the template is not already stored in the single-instance storage system then it may be stored. Otherwise an existing copy of the template may be referenced. Similarly, existing copies of the values may be referenced if they are already present, or otherwise the values may be stored. Reconstruction information useable to reconstruct the data object may also be stored. The reconstruction information may reference the template and the one or more values stored in the single-instance storage system.

20 Claims, 10 Drawing Sheets

DECONSTRUCTION AND TRANSFORMATION OF COMPLEX OBJECTS FOR DE-DUPLICATED STORAGE

BACKGROUND OF THE INVENTION

1. Field of the Invention

This invention relates to the field of computer data storage. More particularly, the invention relates to a single-instance storage system configured to transform or deconstruct complex data objects into sub-objects to increase the efficiency of data de-duplication.

2. Description of the Related Art

Large organizations often use storage systems which store various types of files and other data objects used by a plurality of client computer systems. The storage system may utilize data de-duplication techniques to avoid the amount of data that has to be stored. For example, it is possible that an identical file is stored on multiple client computer systems. For example, client computer systems that execute the same operating system or the same software applications often have many identical files. De-duplication techniques can be utilized so that only a single copy of the file is stored on the storage system. For example, for each client computer system that has a copy of the file, the storage system may store respective metadata representing that copy. The portions of metadata associated with the respective copies of the file may all reference a single instance of the file data (the actual contents of the file). In this way, the storage system can avoid the need to store multiple copies of identical files. A storage system which uses de-duplication to store and reference a single instance of a data object in order to avoid storing multiple copies of the data object is referred to as a single-instance storage system.

De-duplication of a file or other data object is typically performed by computing a fingerprint of the data object, e.g., by applying a hash function to the data object. The single-instance storage system can be checked to determine whether a data object having the fingerprint has already been stored. If so then the existing data object can be referenced without re-storing the data object.

However, this simple approach to de-duplication does not work well for some types of data objects. For example, two data objects may be very similar to each other in their underlying data, but the underlying data may be transformed or packaged into the data objects such that the data object fingerprints are different from each other.

SUMMARY

Various embodiments of a system and method for storing a data object in a single-instance storage system are described herein. The system and method may operate to receive the data object to be stored in the single-instance storage system, and determine that the data object includes a template filled in with one or more values. The system and method may deconstruct the data object into the template and the one or more values.

The system and method may determine whether the template is already stored in the single-instance storage system. If not then the system and method may store the template in the single-instance storage system. Otherwise the system and method may determine that the template does not need to be re-stored in the single-instance storage system.

For each respective value of the one or more values, the system and method may determine whether the respective value is already stored in the single-instance storage system. If not then the system and method may store the respective value in the single-instance storage system. Otherwise the system and method may determine that the respective value does not need to be re-stored in the single-instance storage system.

The system and method may also store reconstruction information useable to reconstruct the data object. The reconstruction information may reference the template and the one or more values in the single-instance storage system. In some embodiments the reconstruction information may indicate a respective location within the template where each of the one or more values should be inserted in order to reconstruct the data object.

In further embodiments, the system and method may subsequently receive a request from a client application to retrieve the data object from the single-instance storage system. In response to the request, the system and method may retrieve the reconstruction information and determine that the reconstruction information references the template and the one or more values. The system and method may retrieve the template and the one or more values from the single-instance storage system, and may reconstruct the data object by inserting the one or more values into the template. The reconstructed data object may be returned to the client application.

In further embodiments, the system and method may operate to transform one or more of the template values into transformed values before storing them in the single-instance storage system. For example, a particular value may be transformed into a transformed value, and the single-instance storage system may be checked to determine whether the transformed value is already stored in the single-instance storage system. If not then the method may operate to store the transformed value in the single-instance storage system. Otherwise the method may determine that the transformed value does not need to be re-stored in the single-instance storage system. The reconstruction information for reconstructing the data object may reference the transformed value and indicate that the transformed value needs to be transformed back into the particular value when the data object is reconstructed. Thus, when the data object is reconstructed in response to a request to retrieve the data object from the single-instance storage system, the method may retrieve the transformed value from the single-instance storage system and transform the transformed value back into the particular value. The particular value may then be inserted into the template.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for storing a data object in a single-instance storage system are described herein. The system and method may operate to transform the data object so that its underlying data can be de-duplicated more efficiently. Various embodiments of transforming a data object are described in detail below.

Figure 1:
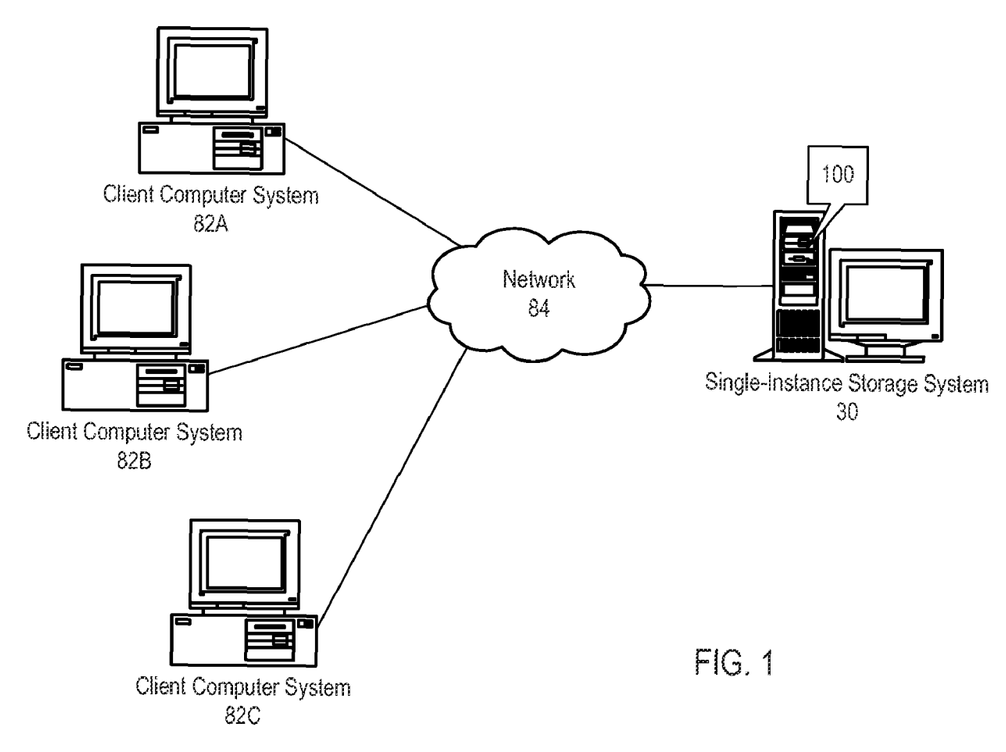
FIG. 1 illustrates a plurality of client computer systems coupled to a single-instance storage system 30 by a network.

FIG. 1 illustrates a plurality of client computer systems 82 coupled to a single-instance storage system 30 by a network 84. In various embodiments, the client computer systems 82 may be coupled to the single-instance storage system 30 by any type of network or combination of networks. For example, the network 84 may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In some embodiments the single-instance storage system 30 may execute single-instance storage software 100 which receives data objects from the client computer systems 82 via the network 84 and applies de-duplication techniques to the data objects as described herein. In other embodiments the single-instance storage software 100 may include a client-side portion that executes on the client computer systems 82 in conjunction with a server-side portion that executes on the single-instance storage system 30.

Figure 2:
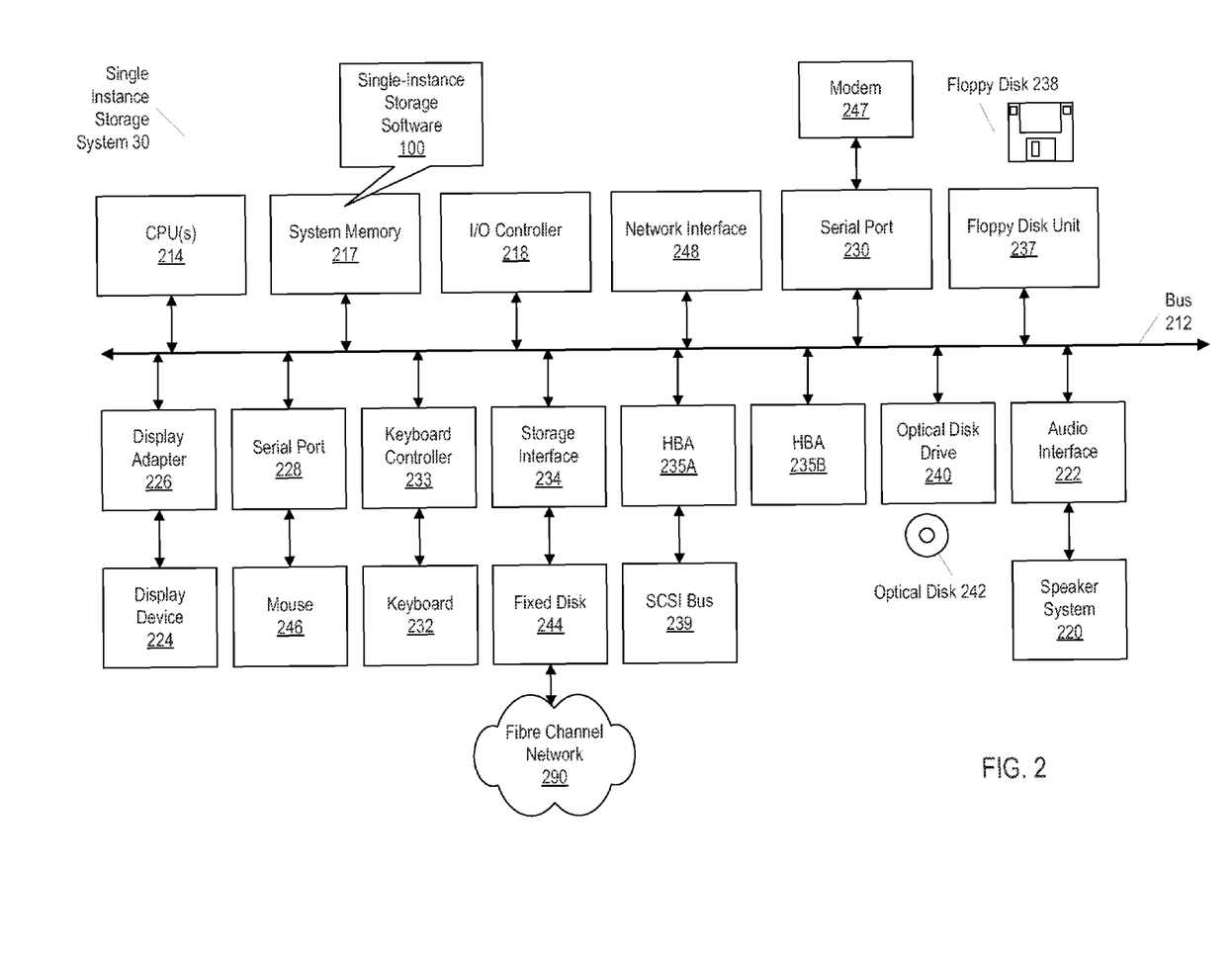
FIG. 2 illustrates an example of the single-instance storage system according to one embodiment.

FIG. 2 illustrates an example of the single-instance storage system 30 according to one embodiment. The single-instance storage system 30 may include a bus 212 which interconnects major subsystems of the single-instance storage system 20, such as one or more central processor units 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded, including the single-instance storage software 100. The ROM or flash memory can contain, among other code, the Basic Input-Output system (BIOS) which controls basic hardware operation such as the interaction with peripheral components. Applications resident with the single-instance storage system 30 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of the single-instance storage system 30, can connect to a standard computer readable medium for storage and/or retrieval of information, such as a fixed disk drive 244. The single-instance storage software 100 may store data objects received from the client computer systems 82 on the disk drive 244. The disk drive 244 may be a part of a computer which includes the CPU 214, or may be separate and accessed through other interface systems.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the single-instance storage techniques described herein may be stored in computer-readable storage media such as one or more of system memory 217, fixed disk 244, optical disk 242, or floppy disk 238. The operating system provided on the single-instance storage system 30 may be MS-DOS®, MS-WINDOWS®, OS/2®, UNIX®, Linux®, or another known operating system.

Figure 3:
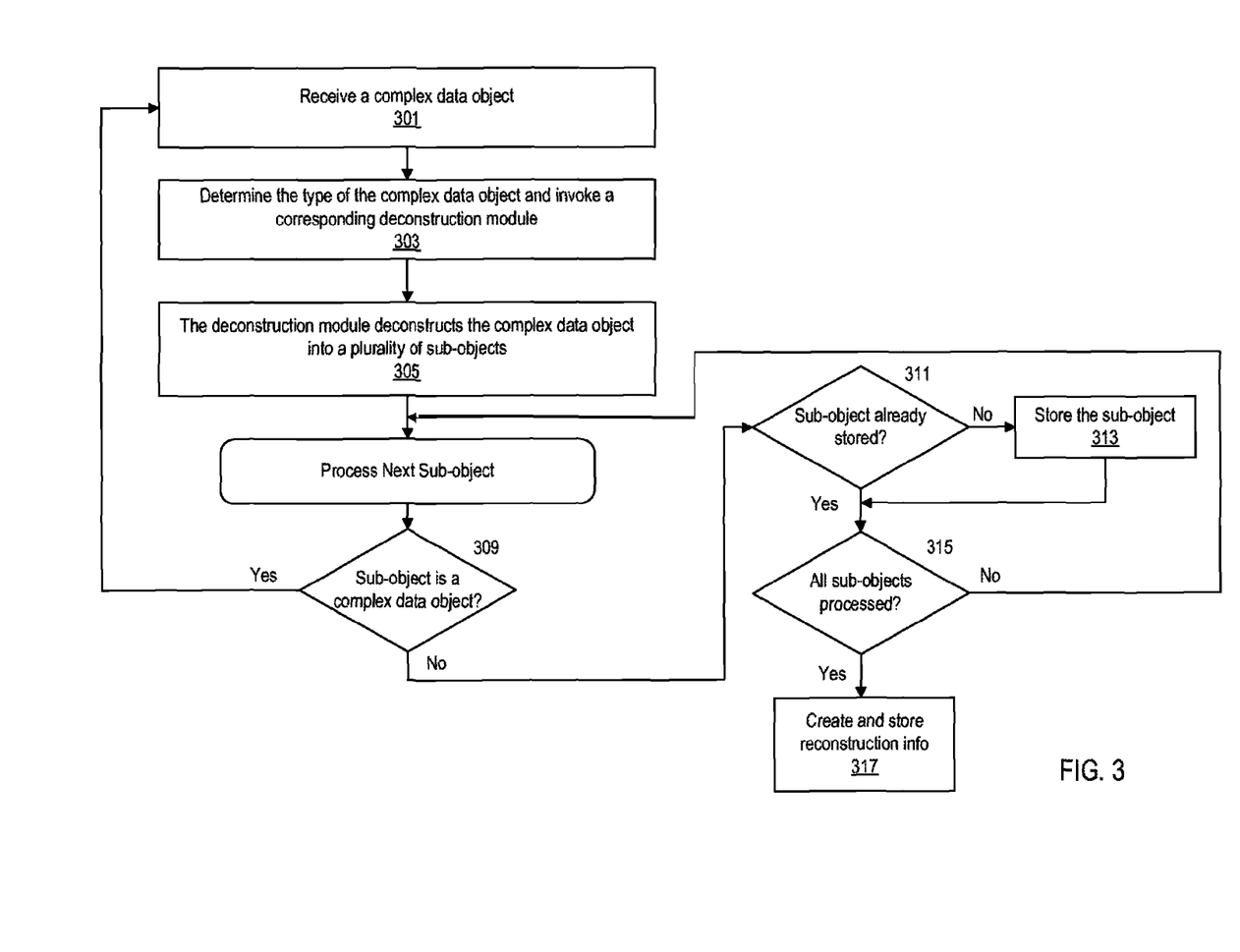
FIG. 3 is a flowchart diagram illustrating one embodiment of a method for storing a data object in the single-instance storage system.

FIG. 3 is a flowchart diagram illustrating one embodiment of a method for storing a data object in the single-instance storage system 30, e.g., where the data object originates from a client computer system 82. The method may be implemented by the single-instance storage software 100. In some embodiments the single-instance storage 100 may execute in the single-instance storage system 30. In other embodiments the single-instance storage 100 may be distributed across the client computer system 82 and the single-instance storage system 30.

The single-instance storage system 30 may receive and store various types of data objects. For some types of data objects, the single-instance storage system may be configured to transform the data object into another form before applying de-duplication techniques to the transformed data. A data object of this kind is referred to herein as a complex data object. For other types of data objects, the single-instance storage system may not be configured to transform the data object, but may simple applying de-duplication techniques to the original data object. A data object of this kind is referred to herein as a simple data object.

The flowchart of FIG. 3 illustrates one embodiment of a method for storing a complex data object. As indicated in block 301, the complex data object may be received by the single-instance storage software 100, e.g., in response to a request to store the complex data object in the single-instance storage system 30. In various embodiments the complex data object may be any type of data object. The technique used by the single-instance storage software 100 to transform the complex data object may depend on what type of data object it is. The single-instance storage software 100 may include various deconstruction modules, where each deconstruction module corresponds to a particular type of data object and is configured to transform or deconstruct data objects of that type. Thus, as illustrated in block 303, the single-instance storage software 100 may determine the type of the complex data object and invoke the corresponding deconstruction module.

In some embodiments the invoked deconstruction module may execute to deconstruct the complex data object into a plurality of sub-objects, as indicated in block 305. Each sub-object may be either a simple data object or another complex data object that can be further deconstructed or transformed. Each respect sub-object of the plurality of sub-objects may then be processed as follows.

If the respective sub-object is a complex data object then the single-instance storage software 100 may recursively perform the method of FIG. 3 to store the complex sub-object, as indicated by the "Yes" arrow pointing from block 309 back to block 301. Otherwise, the single-instance storage software 100 may check to determine whether the sub-object is already stored in the single-instance storage system 30. If not then the single-instance storage software 100 executes to store the sub-object, as indicated by block 313. For example, the sub-object may be stored in a storage pool maintained on the disk drive 244 or other storage device of the single-instance storage system 30. If the sub-object is already stored then it does not need to be stored again, so step 313 can be skipped.

The single-instance storage software then determines whether all of the sub-objects have been processed, as indicated by block 315. If there are other sub-objects to be processed then they are processed similarly as described above.

If all of the sub-objects have been processed then the single-instance storage software 100 may create and store reconstruction information which is useable to reconstruct the complex data object from the sub-objects. The reconstruction information may reference the sub-objects and include any information or metadata needed to reconstruct the complex data object from the sub-objects. Just as the single-instance storage software 100 includes various deconstruction modules for deconstructing different types of complex data objects, the single-instance storage software 100 may also include corresponding reconstruction modules for reconstructing the various types of complex data objects, e.g., in response to requests to restore data objects from the single-instance storage system 30.

Figure 4:
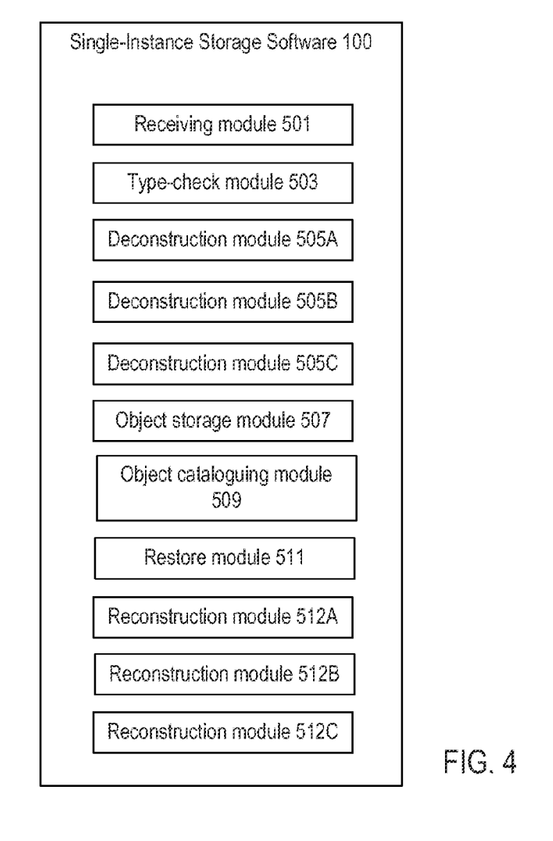
FIG. 4 illustrates single-instance storage software which executes to store the data object in the single-instance storage system.

FIG. 4 illustrates the single-instance storage software 100 in more detail. In the illustrated embodiment, the single-instance storage software 100 includes: a receiving module 501 executable to perform the functionality of receiving the complex data object to be stored, and a type-check module 503 executable to perform the functionality of determining the type of the complex data object and invoking the corresponding deconstruction module 505. In this example there are three different deconstruction modules 505A, 505B and 505C corresponding to three different data object types, but in various embodiments there may be any number of deconstruction modules 505. As described above, the deconstruction module 505 may deconstruct the complex data object into a plurality of sub-objects. The single-instance storage software 100 also includes an object storage module 507 executable to perform the functionality of checking whether each sub-object is already stored, and storing the ones that are not already stored. The single-instance storage software 100 also includes an object cataloguing module 509 executable to perform the functionality of creating and storing the reconstruction information.

It is noted that various modules of the single-instance storage software 100 may execute on various devices within the single-instance storage system 30 and/or may execute within the client computer systems 82. For example, in some embodiments the deconstruction module 505 may execute within a client computer system 82 to deconstruct a data object before sending the sub-objects to the single-instance storage system 30 for storage. The client computer system 82 may communicate with the single-instance storage system 30 to determine which of the sub-objects have already been stored. Only the ones not already stored may be transmitted to the single-instance storage system 30. As another example, in some embodiments the deconstruction module 505 may execute within a server computer included in the single-instance storage system 30. Thus, in some embodiments the client computer system 82 may send the original data object to the server computer, which then deconstructs the data object. As another example, in some embodiments the deconstruction module 505 may execute within a storage sub-system of the single-instance storage system 30. For example, the client computer system 82 may send the original data object to a server computer of the single-instance storage system 30, and the server computer may then transmit the data object to a storage device which includes logic for performing the data object deconstruction and single-instance storage techniques described herein.

After the complex data object has been stored in the single-instance storage system 30, the complex data object may subsequently need to be restored to the client computer system 82 from which the data object originated (or to another client computer system). The single-instance storage software 100 includes a restore module 511 executable to receive a request from a client application to retrieve the data object from the single-instance storage system. In response to the request, the restore module 511 may determine the type of the data object and invoke the corresponding reconstruction module 512. The selected reconstruction module 512 may retrieve the reconstruction information for the data object and use it to reconstruct the data object. Reconstructing the data object may include retrieving the stored sub-objects from the single-instance storage system 30 and coagulating or transforming them into the original data object. The reconstructed data object may then be returned to the client application.

Figure 5:
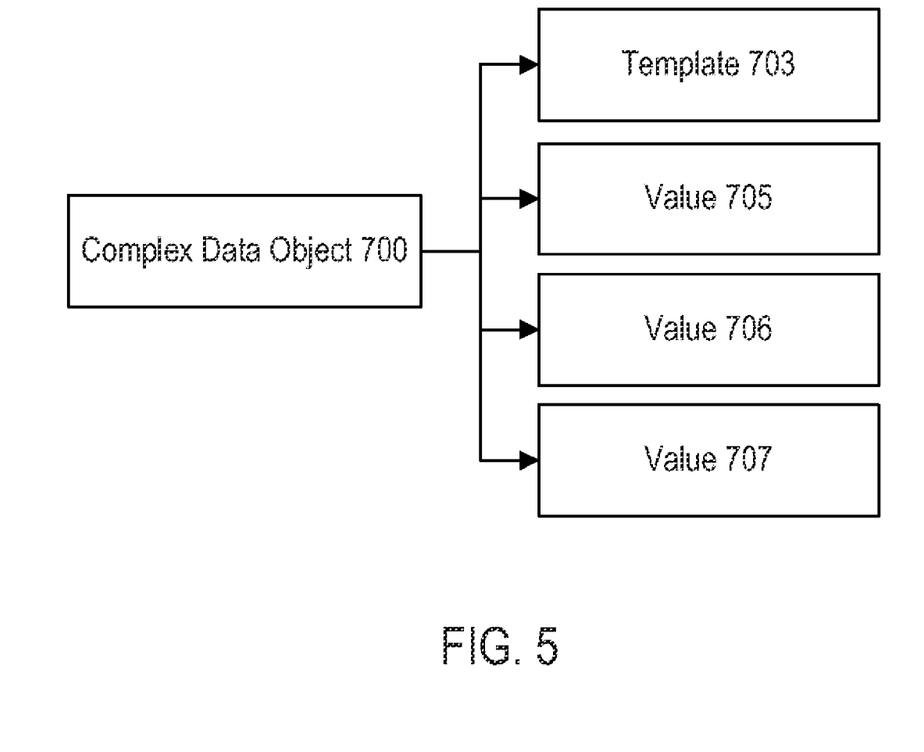
FIG. 5 illustrates an example in which a complex data object has been deconstructed into a template and three values.

In some embodiments the deconstruction module 505 for a particular type of complex data object may determine that the data object includes a template filled in with one or more values, and may deconstruct the data object into the template and values. FIG. 5 illustrates an example in which a complex data object 700 has been deconstructed into a template 703 and three values 705, 706 and 707. Thus, the template 703 and the values 705, 706 and 707 are the sub-objects in this example.

Figure 6:
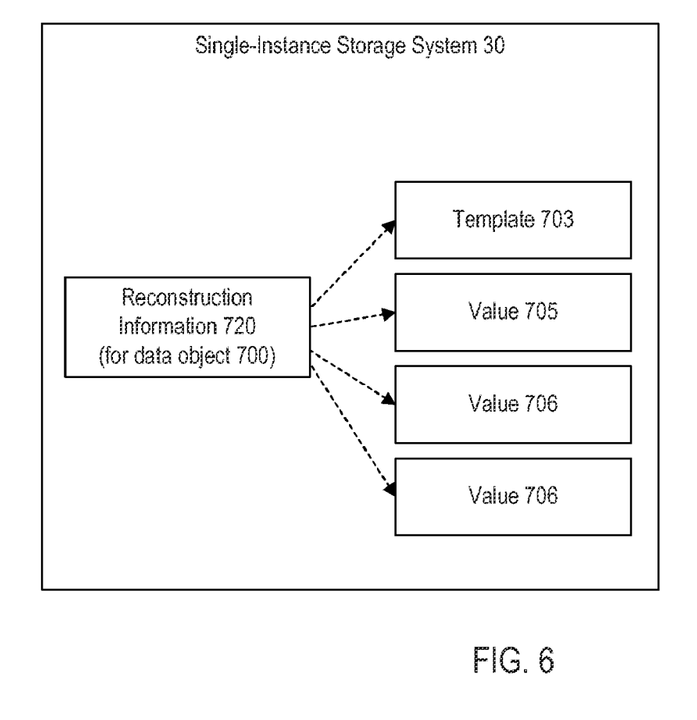
FIG. 6 illustrates the single-instance storage system after the complex data object has been stored.

Suppose that none of the sub-objects were stored in the single-instance storage system 30 before the request to store the complex data object was received. Thus, the single-instance storage software 100 may determine that the template 703 and the three values 705, 706 and 707 all need to be stored. FIG. 6 illustrates the single-instance storage system 30 after the template 703 and the three values 705, 706 and 707 have been stored. As illustrated, the reconstruction information 720 for the data object 700 references or specifies the stored template 703 and the three values 705, 706 and 707. The reconstruction information 720 may also indicate the location within the template where each of the values needs to be inserted in order to reconstruct the original data object 700.

Figure 7:
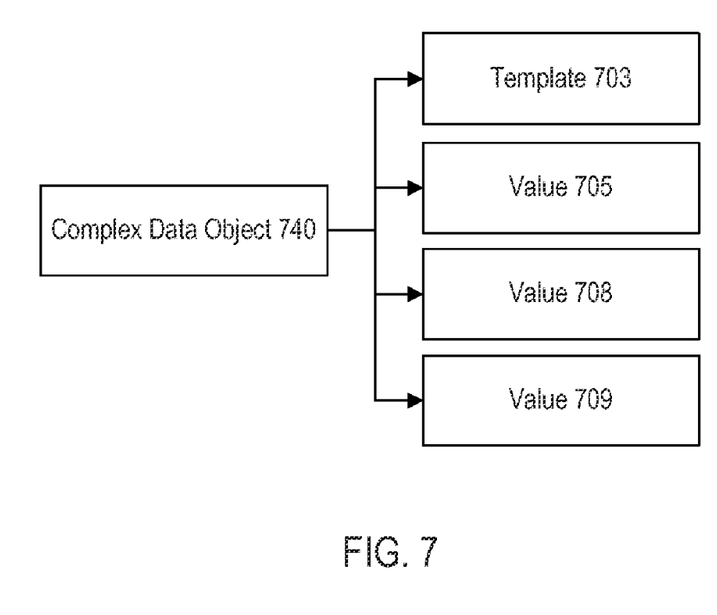
FIG. 7 illustrates an example in which an additional complex data object has been deconstructed into a template and three values.
Figure 8:
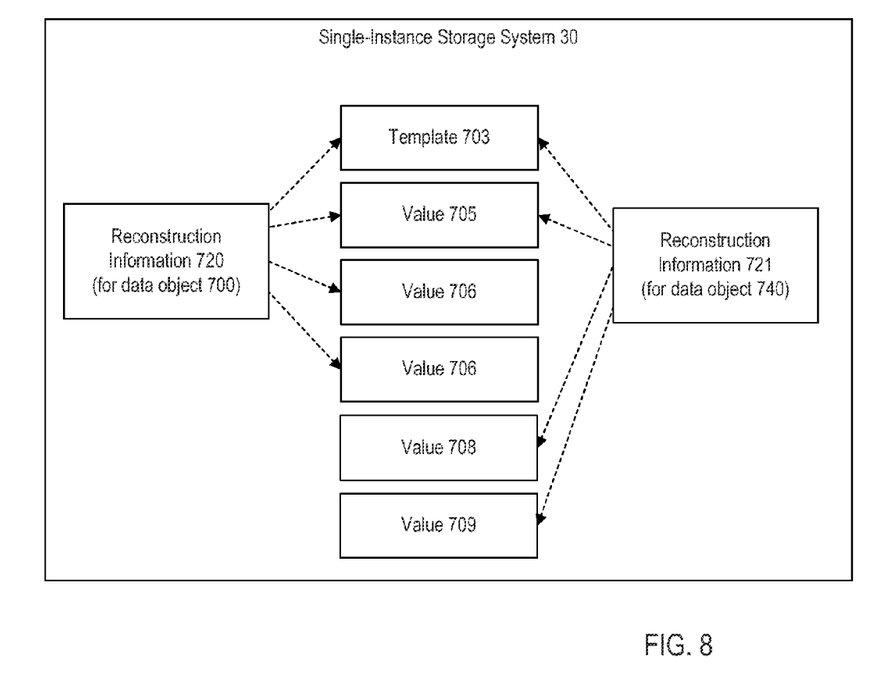
FIG. 8 illustrates the single-instance storage system after the additional complex data object has been stored.

Suppose now that after the complex data object 700 has been stored, a request to store another complex data object 740 of the same type is received. FIG. 7 illustrates an example in which the complex data object 740 has been deconstructed into the template 703 and three values 705, 708 and 709. Since the template 703 and the value 705 are already stored in the single-instance storage system 30, these do not need to be stored again. Only the values 708 and 709 need to be stored. FIG. 8 illustrates the single-instance storage system 30 after the complex data object 740 has been stored. As illustrated, the reconstruction information 721 for the data object 740 references or specifies the stored template 703 and the three values 705, 708 and 709. Thus, a single copy of the template 703 is referenced by both the reconstruction information 720 for the data object 700 and the reconstruction information 721 for the data object 740.

In various embodiments, the techniques described above may result in less duplicated data in the single-instance storage system 30. For example, suppose that many different computer users in a company or organization create documents based on a common template. The template may include data that typically remains constant across all of the documents, and may also include placeholders where specific values are inserted in each document. Thus, by deconstructing the documents into the template and values when each document is stored, the data de-duplication efficiency may be increased since a single copy of the template may be referenced by multiple documents in the single-instance storage system 30. Furthermore, some of the documents may include common values, which may further increase the data de-duplication efficiency. For example, if two documents both include a value then a single copy of the value can be stored and referenced by both documents.

In other embodiments, other types of transformations or deconstruction techniques may be used for other types of data objects. For example, consider a complex data object such as a MIME-encoded email. The single-instance storage software 100 may decode the email into its component parts and evaluate the components separately to determine whether or not they are already stored in the single-instance storage system 30. Components that are already stored may be referenced without storing them again. This may increase the decrease the amount of storage space required to store email objects. For example, suppose that two different email objects have identical file attachments. A single copy of the file attachments can be stored in the single-instance storage system 30 and referenced by the reconstruction information for both emails.

As another example, consider a compressed data object received for storage in the single-instance storage system 30. In some embodiments the single-instance storage software 100 may first de-compress the data object. The single-instance storage software 100 may then split the de-compressed data into segments and check whether each segment is already stored in the single-instance storage system 30. Only the segments that are not already stored need to be copied into the single-instance storage system 30. The segments that are already stored can simply be referenced without storing them again. This may increase the increase the amount of data de-duplication for compressed data objects. For example, suppose that the underlying data in two compressed files is substantially similar with only minor changes. Although the underlying data is very similar, the compression algorithm used to compress the data may result in the compressed files being very different from each other. Thus, without first decompressing the files, the files may not have any data segments in common. However, if the files are first de-compressed then most of the de-compressed file segments may be the same in both files. Thus, the reconstruction information for each file may reference a single copy of most of the de-compressed file segments (plus any segments that are unique for each file). The reconstruction information may also indicate that each respective file needs to be recompressed when it is restored so that the original compressed file will be returned to a client application in response to a request to restore the file.

As another compression example, consider a file which has been compressed using two different compression algorithms. Although the underlying file is identical, the two compressed versions of the file will be different. Thus, by de-compressing the file first before storing it, the single-instance storage software may transform both versions of the file back into the same original file, with the result that the file data only needs to be stored once and can be referenced by both copies. The reconstruction information for each copy of the file specifies the appropriate compression algorithm that needs to be used to transform the copy back into the respective compressed form when the copy is restored. It is noted that in order for this technique to work, the compression/decompression algorithm needs to be completely reversible so that the original data objects can be restored correctly.

Figure 9:
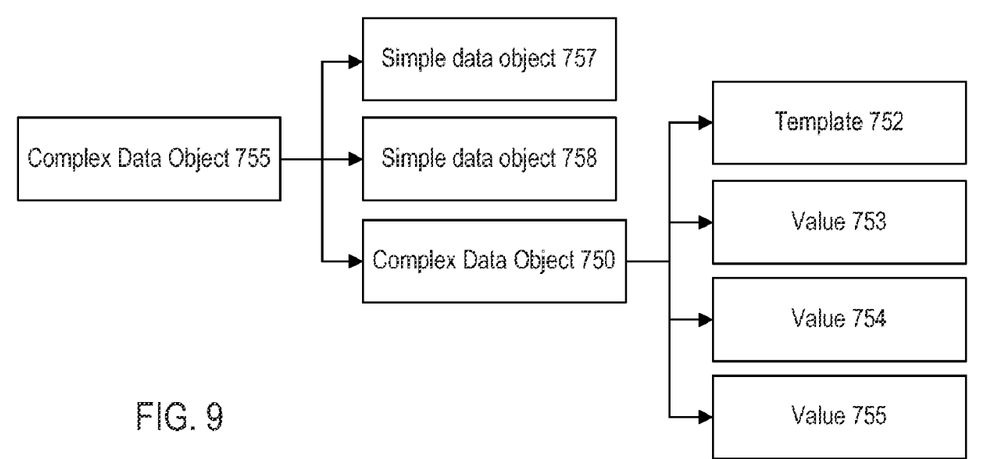
FIGS. 9 and 10 illustrate an example of recursively deconstructing and storing a complex data object in the single-instance storage system.
Figure 10:
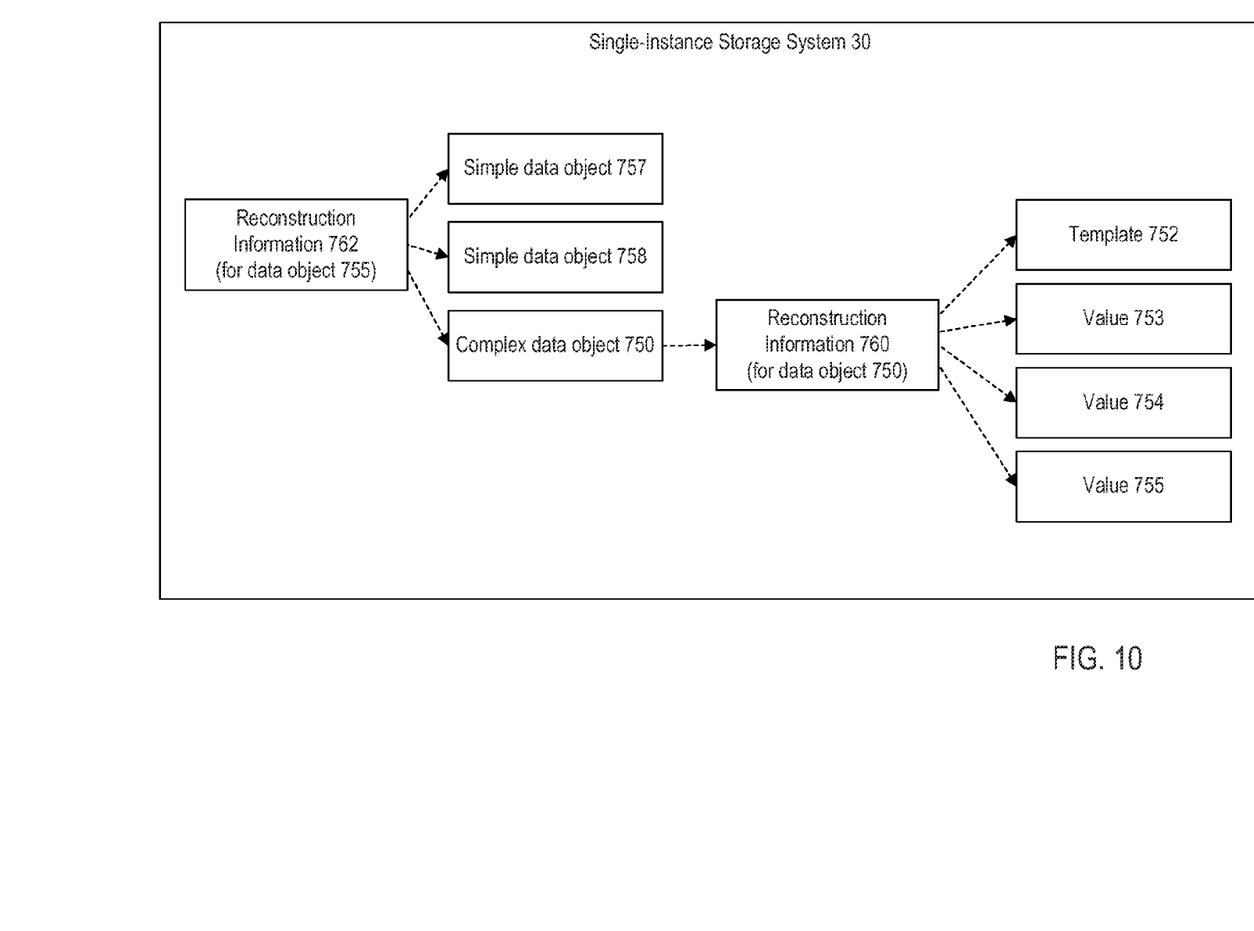

As discussed above with reference to FIG. 3, when a complex data object is deconstructed, one or more of its sub-objects may themselves be complex data objects. Deconstruction or transformation may be recursively applied to the complex sub-objects. FIG. 9 illustrates an example in which a complex data object 755 has been deconstructed into a simple data object 757, a simple data object 758, and a complex data object 750. The complex data object 750 has in turn been deconstructed into a template 752 and values 753, 754 and 755. As illustrated in FIG. 10, the reconstruction information 762 for the data object 755 specifies that the data object 755 is composed of the simple data object 757, the simple data object 758, and the complex data object 750. The reconstruction information 760 for the data object 750 specifies that the data object 750 is composed of the template 752 and values 753, 754 and 755.

When a request to restore the data object 755 is received, the single-instance storage software 100 may retrieve the simple data objects 757 and 758 from storage. The single-instance storage software 100 may also use the reconstruction information 760 to reconstruct the complex data object 750, e.g., by retrieving the template 752 and values 753, 754 and 755 from storage and then inserting the values 753, 754 and 755 into the template 752 at the appropriate locations specified by the reconstruction information 760. Once the complex data object 750 has been reconstructed, the single-instance storage software 100 may then reconstruct the data object 755 from the simple data objects 757 and 758 and the complex data object 750. The single-instance storage software 100 may then return the reconstructed data object 755 to the client application which requested the data object 755 to be restored.

In the example of FIGS. 9 and 10, a single level of recursive deconstruction is shown. However, in various embodiments the single-instance storage software 100 may apply recursive deconstruction to an arbitrary number of levels. For example, a first complex data object may be deconstructed into one or more simple data objects and a second complex data object. The second complex data object may in turn be deconstructed into one or more simple data objects and a third complex data object, and so on. Thus, complex data objects may be deconstructed into data objects, and de-duplication may then be applied to the simple data objects. Also, in some embodiments, once the simple data objects have been derived, the simple data objects may be split into segments, and de-duplication may be performed on the basis of the individual segments. This may further increase the amount of data de-duplication achieved in the single-instance storage system 30. In some embodiments the single-instance storage software 100 may use different de-duplication segment sizes for different types of simple data objects derived from a complex data object.

In some embodiments in which a data object is deconstructed into a template and values, the single-instance storage software 100 may transform or encode one or more of the template values into transformed values before storing them. The reconstruction information for the data object may specify any re-transformations that need to be performed in order to re-transform the template values back into their original form before inserting them in the template.

For example, a particular value may be transformed into a transformed value, and the single-instance storage system may be checked to determine whether the transformed value is already stored in the single-instance storage system. If not then the single-instance storage software 100 may operate to store the transformed value in the single-instance storage system. Otherwise the single-instance storage software 100 may determine that the transformed value does not need to be re-stored in the single-instance storage system. The reconstruction information created by the single-instance storage software 100 may reference the transformed value and indicate that the transformed value needs to be transformed back into the particular value when the data object is reconstructed. Thus, when the data object is reconstructed in response to a request to retrieve the data object from the single-instance storage system, the single-instance storage software 100 may retrieve the transformed value from the single-instance storage system and transform the transformed value back into the particular value. The particular value may then be inserted into the template.

As one example of transforming a template value, suppose that the value is a text value specifying a date. The text value may be transformed into a binary value before being stored in the single-instance storage system. When the data object is reconstructed, the binary value may be transformed back into the text value before being inserted in the template.

In various embodiments the single-instance storage software 100 may be configured to recognize particular templates using any of various techniques. For example, templates may be specified or configured by an administrator, or a library of well-known templates may be used. In some embodiments, if the single-instance storage software 100 determines that a data object includes an unknown template then the single-instance storage software 100 may select a known template that best matches the unknown template and use the known template to deconstruct, or partially deconstruct, the data object.

In some embodiments the single-instance storage software 100 may not deconstruct data objects which are smaller than a threshold size. For example, in some systems the added complexity and overhead of deconstructing files or other data objects smaller than a certain size may outweigh the potential savings in storage space.

Various embodiments of a method for storing a data object in a single-instance storage system have been described above. The method is implemented by various devices operating in conjunction with each other, and causes a transformation to occur in one or more of the devices. For example, a disk drive or other storage device of the single-instance storage system 30 may be transformed by storing the various simple data objects derived from a complex data object.

It is noted that various functions described herein may be performed in accordance with cloud-based computing techniques or software as a service (Saas) techniques in some embodiments. For example, in some embodiments the functionality of the single-instance storage software 100 may be provided as a cloud computing service.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-accessible storage medium storing program instructions executable to:
   receive a data object to be stored in a single-instance storage system;
   determine that the data object includes a template filled in with one or more values;
   deconstruct the data object into the template and the one or more values;
   determine whether the template is already stored in the single-instance storage system, wherein the program instructions are executable to store the template in the single-instance storage system if the template is not already stored in the single-instance storage system, wherein the program instructions are executable to determine that the template does not need to be re-stored in the single-instance storage system if the template is already stored in the single-instance storage system;

for each respective value of the one or more values, determine whether the respective value is already stored in the single-instance storage system, wherein the program instructions are executable to store the respective value in the single-instance storage system if the respective value is not already stored in the single-instance storage system, wherein the program instructions are executable to determine that the respective value does not need to be re-stored in the single-instance storage system if the respective value is already stored in the single-instance storage system; and store reconstruction information useable to reconstruct the data object, wherein the reconstruction information references the template and the one or more values in the single-instance storage system.

2. The computer-accessible storage medium of claim 1, wherein the program instructions are further executable to:
receive a request from a client application to retrieve the data object from the single-instance storage system;
in response to the request, retrieve the reconstruction information and determine that the reconstruction information references the template and the one or more values;
retrieve the template and the one or more values from the single-instance storage system;
reconstruct the data object by inserting the one or more values into the template; and
return the reconstructed data object to the client application.

3. The computer-accessible storage medium of claim 1, wherein the reconstruction information indicates a respective location within the template where each of the one or more values should be inserted in order to reconstruct the data object.

4. The computer-accessible storage medium of claim 1, wherein the one or more values includes a particular value;
wherein the program instructions are executable to determine whether the particular value is already stored in the single-instance storage system by:
transforming the particular value into a transformed value; and
determining whether the transformed value is already stored in the single-instance storage system, wherein the program instructions are executable to store the transformed value in the single-instance storage system if the transformed value is not already stored in the single-instance storage system, wherein the program instructions are executable to determine that the transformed value does not need to be re-stored in the single-instance storage system if the transformed value is already stored in the single-instance storage system;
wherein the reconstruction information references the transformed value and indicates that the transformed value needs to be transformed back into the particular value when the data object is reconstructed.

5. The computer-accessible storage medium of claim 4, wherein the program instructions are further executable to:
receive a request from a client application to retrieve the data object from the single-instance storage system;
in response to the request, retrieve the reconstruction information and reconstruct the data object using the reconstruction information, wherein reconstructing the data object includes:
determining that the reconstruction information references the transformed value and indicates that the transformed value needs to be transformed back into the particular value;
retrieving the transformed value from the single-instance storage system;
transforming the transformed value back into the particular value; and
inserting the particular value into the template;
wherein the program instructions are further executable to return the reconstructed data object to the client application.

6. The computer-accessible storage medium of claim 1, wherein the data object is a first data object, wherein the one or more values include a first value, wherein the reconstruction information is first reconstruction information;
wherein after the first data object has been stored in the single-instance storage system, the program instructions are executable to:
receive a second data object to be stored in the single-instance storage system, wherein the second data object includes the template filled in with the first value and one or more additional values;
deconstruct the data object into the template, the first value, and the one or more additional values;
determine that the template does not need to be re-stored in the single-instance storage system because the template is already stored in the single-instance storage system;
determine that the first value does not need to be re-stored in the single-instance storage system because the first value is already stored in the single-instance storage system;
store each respective value of the one or more additional values in the single-instance storage system in response to determining that the respective value is not already stored in the single-instance storage system; and
store second reconstruction information useable to reconstruct the second data object, wherein the second reconstruction information references the template, the first value, and the one or more additional values.

7. The computer-accessible storage medium of claim 1, wherein the data object is a document file, wherein the document file includes the template filled in with the one or more values.

8. The computer-accessible storage medium of claim 1, wherein the data object is a data object of a particular type;
wherein the program instructions are further executable to:
determine that the data object is of the particular type;
determine that a particular deconstruction module is configured to deconstruct data objects of the particular type; and
invoke execution of the particular deconstruction module, wherein the particular deconstruction module is executable to deconstruct the data object into the template and the one or more values.

9. The computer-accessible storage medium of claim 1, wherein the data object is a first data object;
wherein the one or more values include a first value that is not already stored in the single-instance storage system prior to receiving the data object;
wherein the program instructions are executable to store the first value in the single-instance storage system by:
determining that the first value is second data object of a particular type;
determine that a particular deconstruction module is configured to deconstruct data objects of the particular type;

invoke execution of the particular deconstruction module, wherein the particular deconstruction module is executable to deconstruct the second data object into two or more additional data objects; and
store each of the additional data objects in the single-instance storage system.

10. A method comprising:
receiving a data object to be stored in a single-instance storage system;
determining that the data object includes a template filled in with one or more values;
deconstructing the data object into the template and the one or more values;
determining whether the template is already stored in the single-instance storage system, wherein method comprises storing the template in the single-instance storage system if the template is not already stored in the single-instance storage system, wherein the method comprises determining that the template does not need to be re-stored in the single-instance storage system if the template is already stored in the single-instance storage system;
for each respective value of the one or more values, determining whether the respective value is already stored in the single-instance storage system, wherein the method comprises storing the respective value in the single-instance storage system if the respective value is not already stored in the single-instance storage system, wherein the method comprises determining that the respective value does not need to be re-stored in the single-instance storage system if the respective value is already stored in the single-instance storage system; and
storing reconstruction information useable to reconstruct the data object, wherein the reconstruction information references the template and the one or more values in the single-instance storage system.

11. The method of claim 10, further comprising:
receiving a request from a client application to retrieve the data object from the single-instance storage system;
in response to the request, retrieving the reconstruction information and determining that the reconstruction information references the template and the one or more values;
retrieving the template and the one or more values from the single-instance storage system;
reconstructing the data object by inserting the one or more values into the template; and
returning the reconstructed data object to the client application.

12. The method of claim 10,
wherein the reconstruction information indicates a respective location within the template where each of the one or more values should be inserted in order to reconstruct the data object.

13. The method of claim 10,
wherein the data object is a first data object, wherein the one or more values include a first value, wherein the reconstruction information is first reconstruction information;
wherein after the first data object has been stored in the single-instance storage system, the method further comprises:
receiving a second data object to be stored in the single-instance storage system, wherein the second data object includes the template filled in with the first value and one or more additional values;
deconstructing the data object into the template, the first value, and the one or more additional values;
determining that the template does not need to be re-stored in the single-instance storage system because the template is already stored in the single-instance storage system;
determining that the first value does not need to be re-stored in the single-instance storage system because the first value is already stored in the single-instance storage system;
storing each respective value of the one or more additional values in the single-instance storage system in response to determining that the respective value is not already stored in the single-instance storage system; and
storing second reconstruction information useable to reconstruct the second data object, wherein the second reconstruction information references the template, the first value, and the one or more additional values.

14. The method of claim 10,
wherein the data object is a document file, wherein the document file includes the template filled in with the one or more values.

15. The method of claim 10,
wherein the data object is a data object of a particular type;
wherein the method further comprises:
determining that the data object is of the particular type;
determining that a particular deconstruction module is configured to deconstruct data objects of the particular type; and
invoking execution of the particular deconstruction module, wherein the particular deconstruction module is executable to deconstruct the data object into the template and the one or more values.

16. A system comprising:
one or more processors; and
memory storing program instructions;
wherein the program instructions are executable by the one or more processors to:
receive a data object to be stored in a single-instance storage system;
determine that the data object includes a template filled in with one or more values;
deconstruct the data object into the template and the one or more values;
determine whether the template is already stored in the single-instance storage system, wherein the program instructions are executable to store the template in the single-instance storage system if the template is not already stored in the single-instance storage system, wherein the program instructions are executable to determine that the template does not need to be re-stored in the single-instance storage system if the template is already stored in the single-instance storage system;
for each respective value of the one or more values, determine whether the respective value is already stored in the single-instance storage system, wherein the program instructions are executable to store the respective value in the single-instance storage system if the respective value is not already stored in the single-instance storage system, wherein the program instructions are executable to determine that the respective value does not need to be re-stored in the single-instance storage system if the respective value is already stored in the single-instance storage system; and store reconstruction information useable to reconstruct the data object, wherein the reconstruction information references the template and the one or more values in the single-instance storage system.

17. The system of claim 16, wherein the program instructions are further executable by the one or more processors to:

receive a request from a client application to retrieve the data object from the single-instance storage system;

in response to the request, retrieve the reconstruction information and determine that the reconstruction information references the template and the one or more values;

retrieve the template and the one or more values from the single-instance storage system;

reconstruct the data object by inserting the one or more values into the template; and return the reconstructed data object to the client application.

18. The system of claim 16,
wherein the reconstruction information indicates a respective location within the template where each of the one or more values should be inserted in order to reconstruct the data object.

19. The system of claim 16,
wherein the data object is a document file, wherein the document file includes the template filled in with the one or more values.

20. The system of claim 16,
wherein the data object is a data object of a particular type;
wherein the program instructions are further executable by the one or more processors to:
  determine that the data object is of the particular type;
  determine that a particular deconstruction module is configured to deconstruct data objects of the particular type; and
  invoke execution of the particular deconstruction module, wherein the particular deconstruction module is executable to deconstruct the data object into the template and the one or more values.

* * * * *